Figure 1:
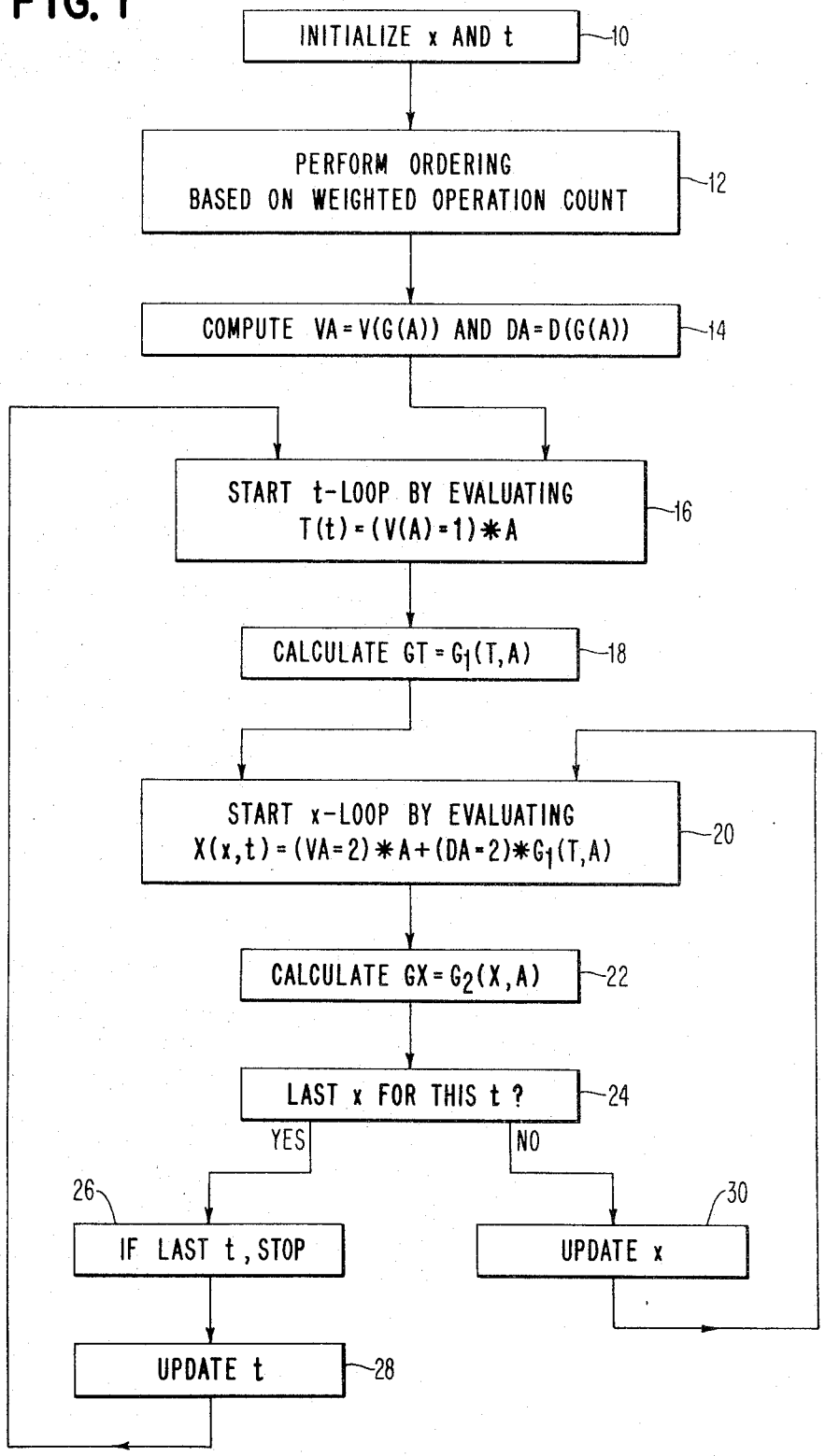
Figure 2:
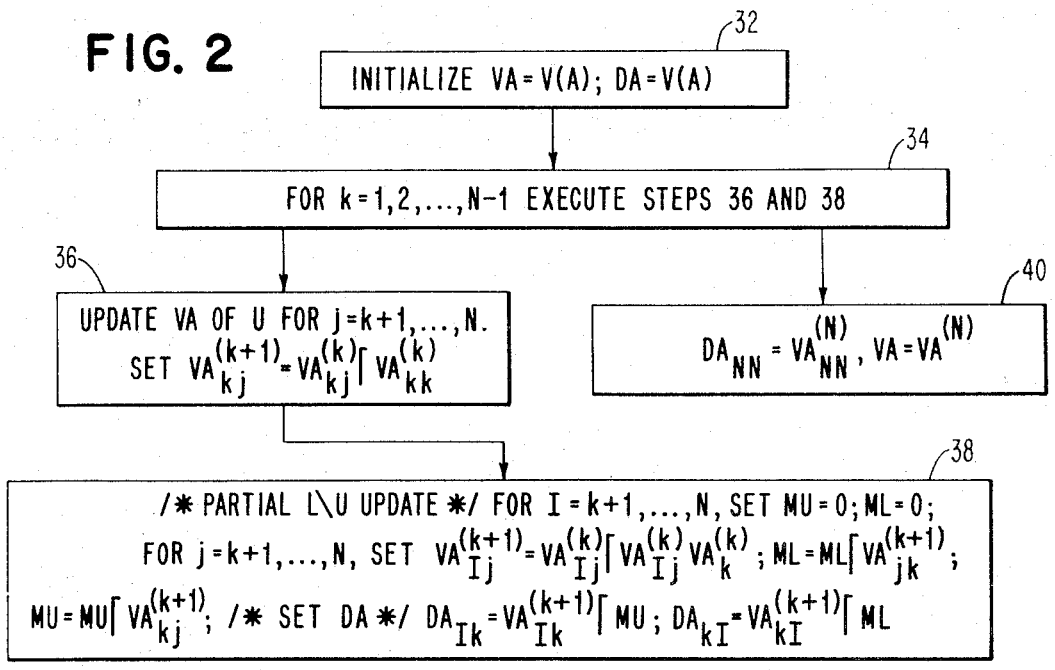
Figure 3:
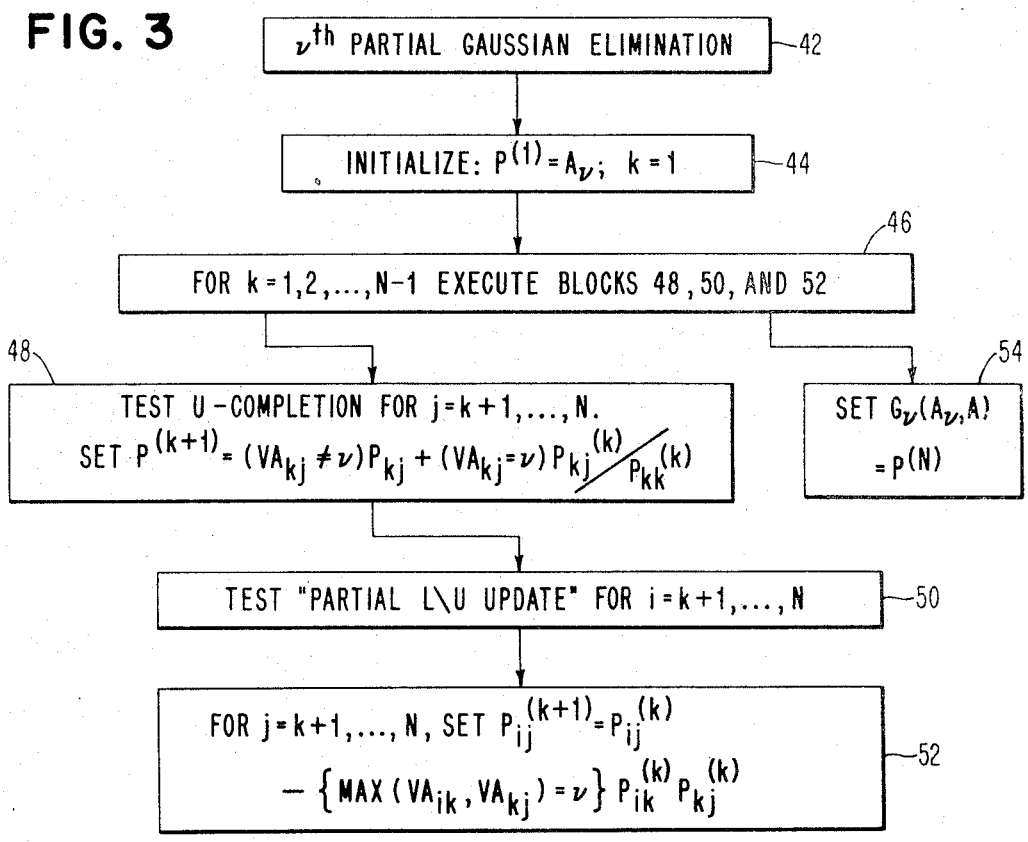
Figure 4:
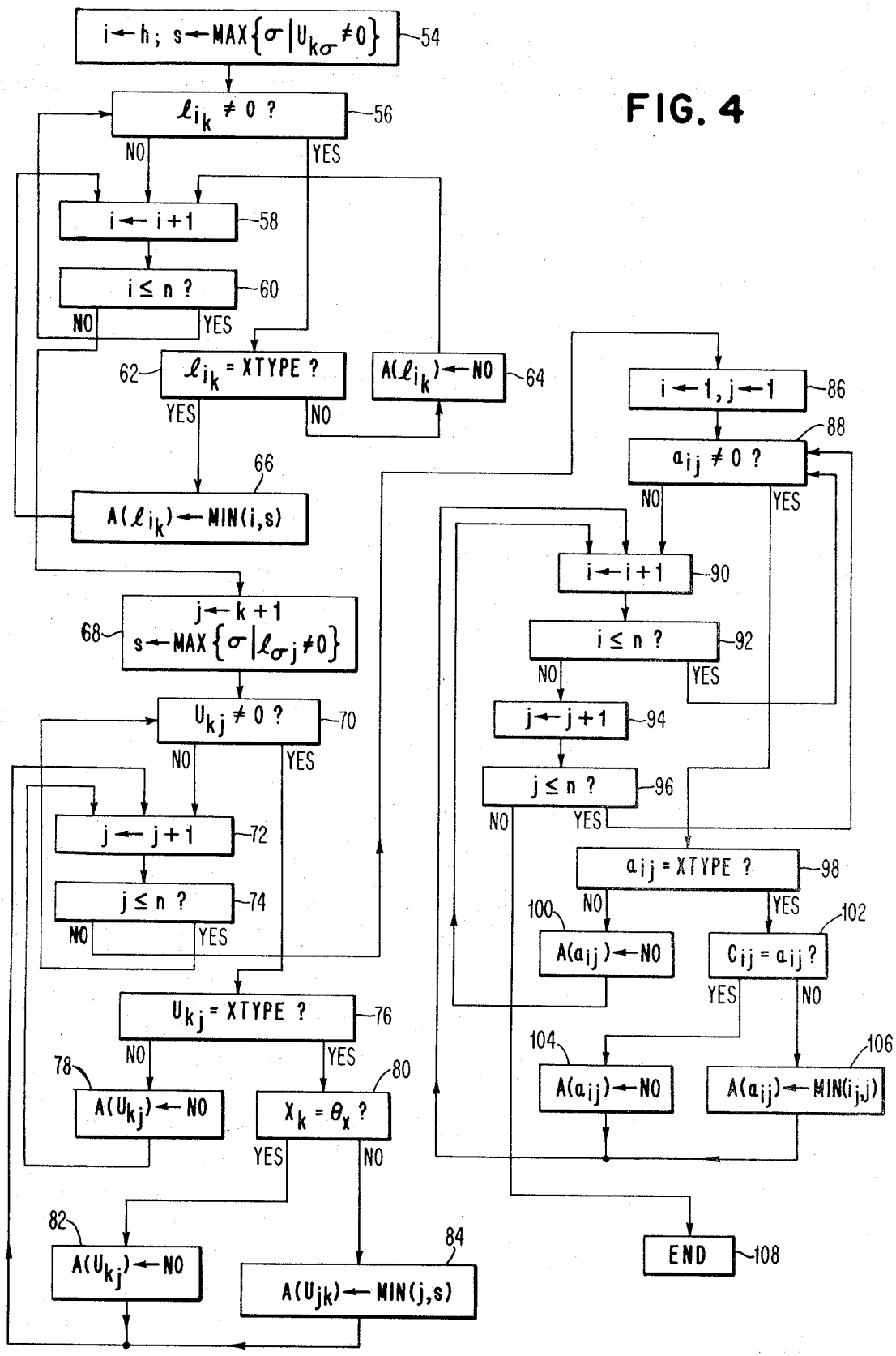

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 4, 1973

917 O.G. 10

T917,010

METHOD OF STORAGE RECLAMATION IN SPARSE MATRIX TECHNIQUES

Robert K. Brayton, Briarcliff Manor, and Fred G. Gustavson and Gary D. Hachtel, Ossining, N.Y., assignors to International Business Machines Corporation, Armonk, N.Y.

Filed Apr. 6, 1973, Ser. No. 348,832
**Int. Cl. G06f *15/32***
U.S. Cl. 444—1
3 Sheets Drawing. 32 Pages Specification

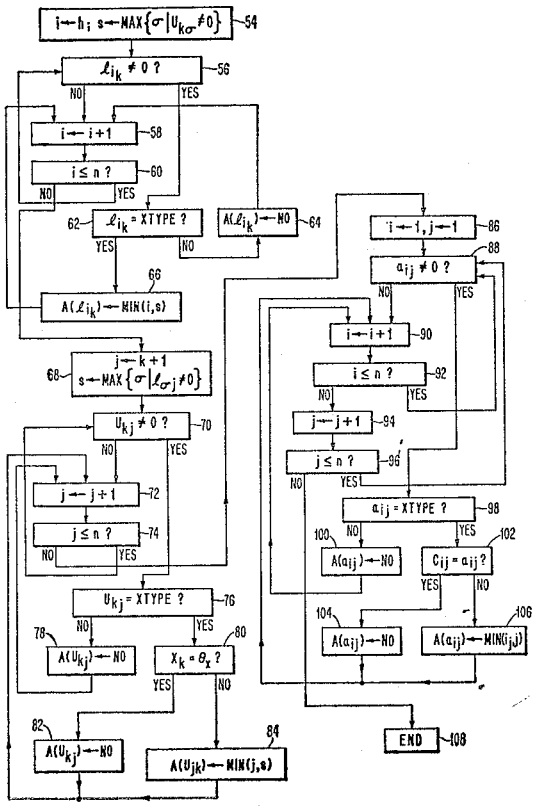

A novel method for optimally reclaiming X storage in the 1–2–3 GNSO technique is set forth. The method defines (1) the minimal storage which is necessary to carry out the 1–2–3 GNSO technique
(2) defines the minimal storage necessary to carry out variability-type Gaussian elimination by looping type code
(3) reduces the amount of code necessary for large problems as the base registers need only span the minimal set of C values
(4) defines the values of the A matrix which can be used for C storage
(5) realizes effects 1–4 for the case of four or more distinct variability types appearing as arguments in the coefficients of the matrix A.

In carrying out the method, assuming that step $k$ of the OPTORD algorithm, as described in the publication of G. D. Hachtel, R. K. Brayton and F. G. Gustavson, "The Sparse Tableau Approach to Network Analysis and Design," IEEE Transactions on Circuit Theory, January 1971, pp. 101–113, has been attained whereby $A^{(k)}$ is had, then a pivot is selected and $A^{(k)}$ is updated to $A^{(k+1)}$ by performing an outer product operation. The following rules are then valid (A) $l_{Ik} i \geq k$ is available if it is of the X type and pivot step $i$ has been reached or if the last element in row $k$ of U has been processed, i.e., $l_{Ik}$ is available at pivot step $I \geq k$ where $I$=min. $(i,s)$ and $s$=max. $\{l/U_{kl} \neq 0\}$
(B) $u_{kj} j > k$ is available if it is of the X type and $x_k$ is not needed to solve $Ux=y$ and when pivot $j$ is reached or when the last element of column $k$ of L is processed, i.e., at pivot stage $j>k$ where $$k=\text{min. } (j,s) \text{ and } s=\text{max. } \{\sigma/l_{\sigma j} \neq 0\}$$

(C) if the formula is not $C=A$, then when $a_{ij}(x)$ is used, it can be reclaimed, i.e., the value of C is stored in the A space.